Patented Jan. 14, 1941

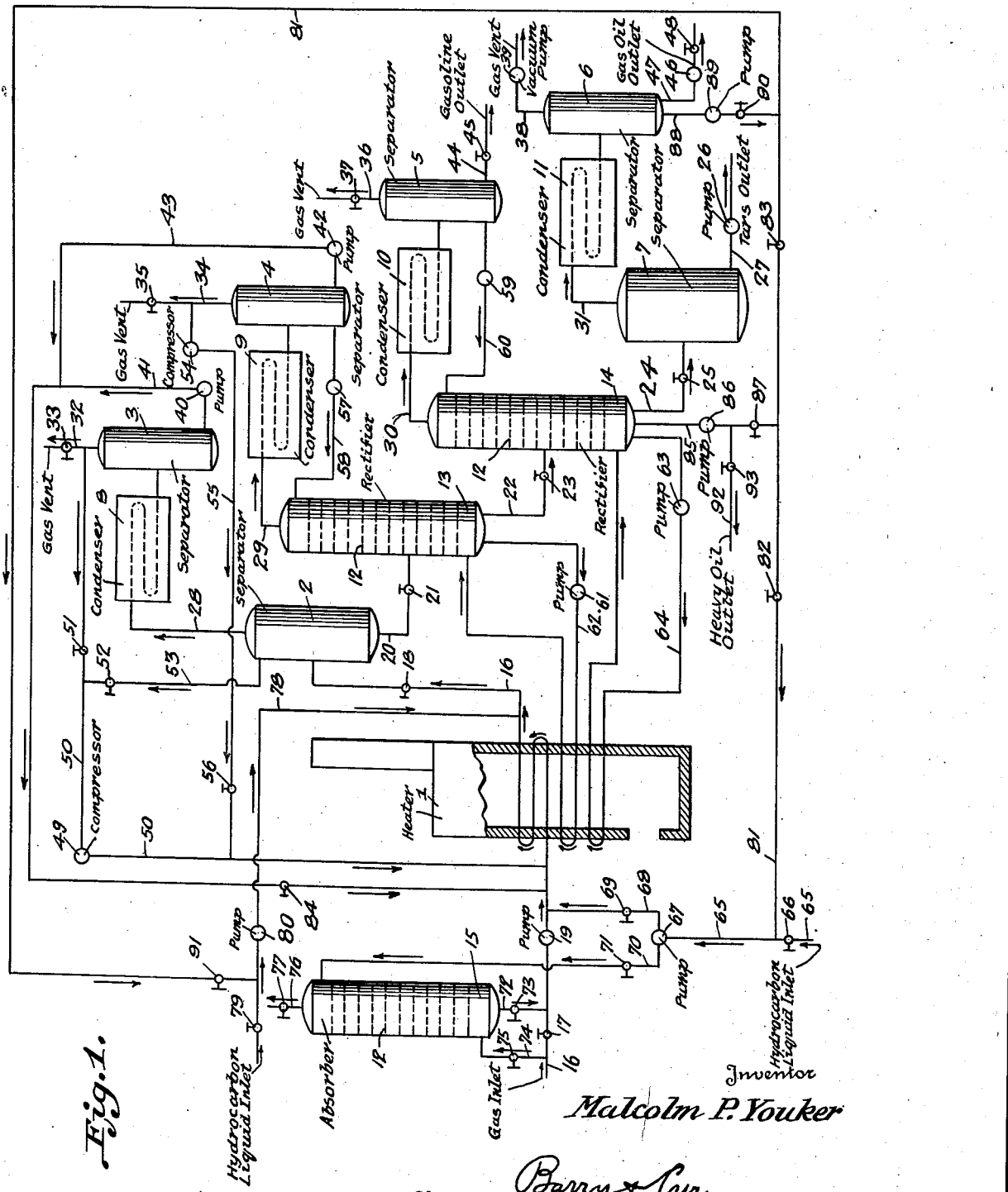

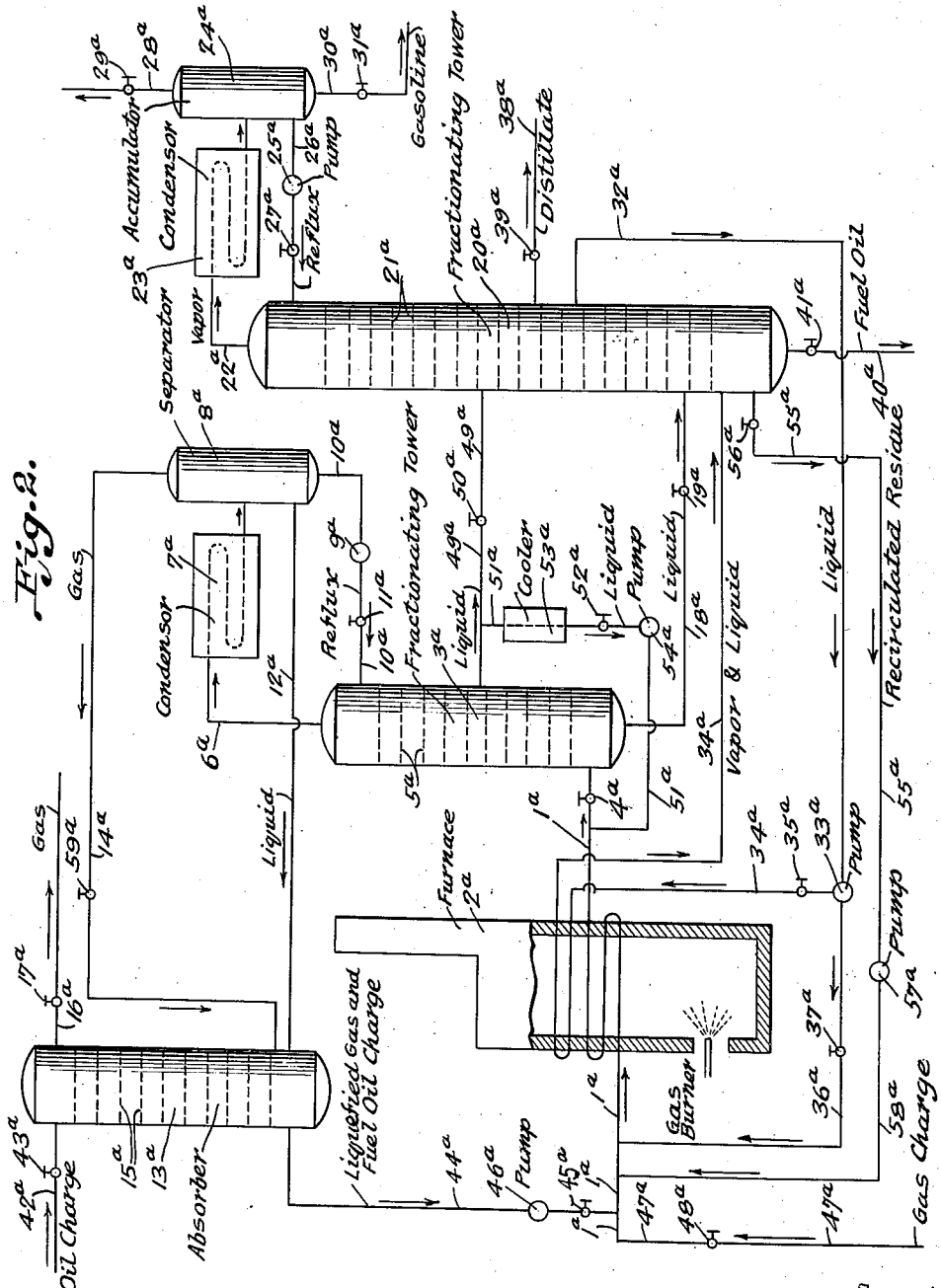

2,228,620

UNITED STATES PATENT OFFICE 2,228,620

PROCESS OF CONVERTING HYDROCARBONS

Malcolm P. Youker, Bartlesville, Okla., assignor to Phillips Petroleum Company, Bartlesville, Okla., a corporation of Delaware Application November 25, 1935, Serial No. 51,506

2 Claims. (Cl. 196—9)

The present invention relates to improvements in processes for simultaneously converting normally gaseous hydrocarbons and normally liquid hydrocarbons, and the present application is a continuation-in-part of my applications Serial Nos. 481,318, filed September 11, 1930 (Patent No. 2,027,460), and 527,267, filed April 2, 1931, which applications are in turn based upon the disclosure in the application which matured into my U. S. Patent No. 1,800,586, dated April 14, 1931.

The objects of the present invention appear in the following description which is to be considered in connection with the accompanying drawings.

In the drawings,

Fig. 1 is a diagrammatic side elevation of one form of apparatus by which my new improvements may be carried out.

Fig. 2 is a similar view of a modification.

Referring to Fig. 1 of the drawings, the numeral 1 designates a furnace through which certain pipe lines are passed. The numerals 2, 3, 4, 5, 6 and 7 designate cylindrical closed vessels which are used for separating vapors and gases from liquids. Pipe lines in which condensation takes place are passed through condensers 8, 9, 10 and 11. Bubble trays 12 are disposed in fractionating columns 13 and 14 and an absorbing tower 15.

Hydrocarbon gases in either liquid or vapor phase will be delivered through a pipe line 16 in which is mounted a valve 17, a pump 19 and a valve 18 and through furnace 1 into separator 2. Liquid which will collect in separator 2 will flow thence through a pipe 20 in which is mounted a valve 21 into the fractionating column 13. Liquid which will collect at the bottom of fractionating column 13 will flow thence through a pipe 22 in which is mounted a valve 23 into the fractionating column 14. Liquid which will collect at the bottom of fractionating column 14 may flow thence through a pipe line 24 in which is mounted a valve 25 into separator 7. Liquid or tar which may accumulate in separator 7, will be discharged therefrom by a pump 26 through a pipe line 27 and a cooler which is not shown. Vapors and permanent gases will pass from the top of separator 2 by way of a pipe line 28 through condenser 8 into separator 3. Vapors and gases will pass from the top of fractionating column 13 by way of a pipe 29 through condenser 9 into separator 4. Vapor and gases will pass from the top of fractionating column 14 by way of a pipe 30 through condenser 10 into separator 5. Vapors will pass from the top of separator 7 by way of pipe line 31 through condenser 11 into separator 6. Gases such as excess hydrogen, hydrogen sulphide, nitrogen, and helium will be vented from the system through a pipe line 32 in which is mounted a back pressure valve 33 and which leads from the top of separator 3. Gases may be vented from the top of separator 4 through a pipe 34 in which is mounted a back pressure valve 35. Gases may be vented from the top of separator 5 through a pipe 36 in which is mounted a back pressure valve 37. A pipe 38 in which is mounted a vacuum pump 39 leads from the top of separator 6. The vacuum pump 39 may be operated to maintain a vacuum in separators 6 and 7 and their inter-connecting pipe line 31. Liquid which will accumulate in the bottom of separator 3 will be pumped by a pump 40 through a pipe line 41 and valve 84 into pipe 16 at a point between the pump 19 and the furnace 1. Liquid which will accumulate in the separator 4 will be delivered by a pump 42 through a pipe 43 and through pipe 41 into the pipe 16 at a point between pump 19 and the furnace 1. Liquid which will collect in the bottom of separator 5 will be delivered thence through a pipe 44 in which is mounted a valve 45. Liquid which will accumulate in the bottom of separator 6 may be delivered thence by a pump 46 through pipe 47 and valve 48. A compresser 49 may be operated to deliver gas from the top of separator 3 through pipe 32 and a pipe 50 and a valve 51 into pipe 16 at a point between pump 19 and furnace 1. By means of manipulating a valve 52 which is mounted in a pipe 53, gas and vapor may be delivered from separator 2 by a compresser 49 into pipe 16 at a point between pump 19 and furnace 1. A compresser 54 may be operated to deliver gas through pipe 34 and pipe 55 and a valve 56 and pipe 50 from the separator 4 into the pipe 16 at a point between pump 19 and furnace 1. A reflux liquid will be delivered from the bottom of separator 4 by means of a pump 57 through a pipe 58 into the top of fractionating column 13. Liquid will be delivered from the bottom of separator 5 by means of a pump 59 through a pipe 60 into the top of fractionating column 14. Liquid will be forced by a pump 61 through a pipe 62 which leads from the bottom of fractionating column 13 through the furnace 1 and back into the bottom of the fractionating column 13. Liquid will be forced from the bottom of fractionating column 14 by a pump 63 through a pipe 64 which leads through the furnace 1 and back into the bottom of fractionating column 14. A pipe 65 in which is mounted a valve 66 and which is in communication with an extraneous supply of hydrocarbon liquid such as fuel oil or gas oil, leads to a pump 67. A pipe 68 in which is mounted a valve 69, leads from the discharge of pump 67 into the pipe 16 at a point between pump 19 and furnace 1. A pipe 70 in which is mounted a valve 71 leads from the discharge of pump 67 into the top of an absorber 15. A pipe 72 in which is mounted a valve 73 leads from the bottom of absorber 15 into pipe line 16 at a point on the suction side of pump 19. Heavy oil such as fuel oil or gas oil may be delivered by the pump 67 through the pipes 65 and 68 into the pipe line 16 at a point between the pump 19 and furnace 1, or such heavy oil may be delivered by the pump 67 through the pipes 65 and 70 into the absorber 15 and thence through pipe 72 into the pipe 16 and thence to pump 19. Gas may be delivered through pipe 16, a pipe 74, and a valve 75 into the bottom of absorber 15 and thence through absorber 15 and a pipe 76 in which is mounted a back pressure valve 77. Heavy oil such as fuel oil or gas oil or crude oil may be delivered through a pipe 78 in which is mounted a valve 79 by a pump 80 into the pipe 16 at a point between furnace 1 and separator 2. A pipe 81 in which are mounted valves 82, 83 and 91, connects into pipe 78 on the suction side of pump 80 and connects into the pipe 65 on the suction side of pump 67. A pipe 85 in which is mounted a pump 86 and a valve 87 leads from the bottom of fractionating column 14 into pipe 81. A pipe 88 in which is mounted a pump 89 and a valve 90 leads from the bottom of separator 6, into pipe 81. By means of the pump 89 and the valves and pipes shown, liquid may be delivered from the bottom of separator 6 to the suction side of either of the pumps 67 or 89. By means of the pump 86 and the valves and the pipes described, liquid may be delivered from the bottom of fractionating column 14 to the suction side of either pump 67 or pump 80. A pipe 92 in which is mounted a valve 93 connects into pipe 85 at a point between pump 86 and valve 87 and liquid may be withdrawn from the bottom of fractionating column 14 through this pipe 92 and delivered to storage through a cooler which is not shown.

Hydrocarbon liquids may be made from hydrocarbon gases by two methods which are closely related. These methods of gas conversion may be used separately or may be combined in the same process. The apparatus shown may be used to carry out either one of these methods or the combination of the two methods. For purposes of clarity, I will describe these methods separately. Some of the hydrogen may be removed from hydrocarbon gases and the remaining hydrogen content of such gases be simultaneously recombined with the carbon content of such gas to form a liquid hydrocarbon, or carbon may be added to hydrocarbon gases and combined with excess hydrogen contained in such gases to form a hydrocarbon liquid. The former case would be de-hydrogenation of hydrocarbon gases and the latter case would be carbonization of hydrocarbon gases.

The apparatus shown will be used to de-hydrogenate gas in the following manner: Hydrocarbon gas in either liquid or gaseous state will be delivered by pump 19 through the pipe 16 and will be heated therein to a temperature preferably between 700 degrees F. and 1000 degrees F. I find that good results may be obtained at 875 degrees F. and that when this temperature is obtained under pressures between 2,000 and 3,000 pounds per square inch, a good conversion from gases to liquids is obtained. After the conversion of part of the gases to liquid has taken place in the pipe 16, cold hydrocarbon liquid will be delivered into said pipe 16 through the pipe 78 by means of the pump 80 in order to cool the mixture of gases and liquid down to such a temperature, say 400 degrees to 600 degrees F., that only gases which are more volatile than gasoline will remain in the vapor or gaseous phase, the cooled converted gases and liquid, together with the hydrocarbon liquid which was extraneously supplied, will then flow into separator 2. Gases and vapors which are more volatile than gasoline will then flow through pipe 28 and condenser 8 into separator 3. The gases and vapors passing through condenser 8 will be cooled and a mixture of liquid and gas will be delivered into separator 3. The material which remains in a gaseous state after passing condenser 8 will be vented from separator 3 and the system through pipe 32 and back pressure valve 33. Some of this gas delivered into separator 3 may be charged to the process through pipe 16 by means of the pipe 50 and the pump 49. Liquid which will collect in separator 3 will be withdrawn therefrom and recirculated through the pipe 16 and thereby through the process by means of pump 40 and pipe 41. Liquid trapped in separator 2 will contain material which is more volatile than gasoline. This liquid will be delivered from separator 2 through pipe 20 into fractionating column 13. The fractionating column 13 will be reboiled by means of circulating liquid through the pipe 62 and through the furnace. Vapors will flow from fractionating column 13 through pipe 29 and be cooled and condensed in condenser 9 and will flow thence into separator 4. Liquid will be refluxed from the bottom of separator 4 by pump 57 through pipe 58 into the top of fractionating column 13 and a temperature at the top of fractionating column 13 will be maintained such that only liquids which are more volatile than gasoline will leave the fractionating column 13 in the vapor phase through the pipe 29. Liquids which collect in separator 4 will be recharged to the apparatus through the pipe 16 by means of the pump 42 and the pipes 43 and 41. Permanent gases which may collect in separator 4 will be vented from the system through pipe 34 and back pressure valve 35. Gases which collect in separator 4 may be recharged to the apparatus through pipe 16 by means of pump 54 and pipes 55 and 59. Liquid which contains gasoline and heavier hydrocarbon material will be discharged from the bottom of fractionating column 13 into the fractionating column 14. The bottom of fractionating column 14 will be reboiled by means of circulating liquid through the pump 63 and the pipe 64, and through the furnace. Vapors will be discharged from the fractionating column 14 through the pipe 30 and will be cooled and condensed by the condenser 10 and will flow in liquid form into the separator 5. Liquid will be refluxed from the separator 5 by the pump 59 through the pipe 60 into the top of fractionating column 14, and the temperature at the top of fractionating column 14 will be so maintained that only gasoline vapor will discharge through the pipe 30. Gasoline will be withdrawn from the system through the pipe 44 and the valve 45. Any gases which may accumulate in separator 5 will be vented therefrom through the pipe 36 and valve 37. Liquids which are heavier than gasoline, that is, fuel oil and gas oil, may be withdrawn from the bottom of fractionating column 14 through the pipe 85, pump 86, valve 93 and pipe 92 to storage, or such liquids may be recirculated through the pipe 16 by means of pumps 86 and 67 and pipe line 85, 81, 65 and 68, or such liquids may be recirculated through pumps 86 and 80 through pipes 85, 81 and 78, or such liquids may be discharged from the bottom of fractionating column 14 into the vacuum distillation unit consisting of separator 7, condenser 11, separator 6, and accessory pumps, pipe lines, and vacuum pump 39. This vacuum distillation unit is conventional and is for the purpose of separating gas oil or lubricating oil from fuel oil. Vapors which will be evolved in separator 7 under the low pressure conditions existing therein will pass therefrom through pipe 31 and will be condensed in condenser 11 and flow into separator 6, while tars which will collect in the bottom of separator 7 will be withdrawn therefrom by pump 26 through pipe line 27. Gas oil which will collect in separator 6 may be recirculated through pipe 16 by way of pipes 88, 81 and 68 or by way of pipes 88, 81 and 78. Through manipulation of valves 18 and 21 a pressure of between 2,000 and 3,000 pounds per square inch will preferably be maintained in separator 2 and separator 3 and in pipe lines accessory to the separators. By manipulating valves 23 and 35 a pressure preferably from 400 pounds to 700 pounds per square inch, but sufficiently high to condense in condenser 9 all vapors which pass through pipe 29 will be maintained in the fractionating column 13 and the separator 4 and accessory pipe lines. By manipulation of the valve 37 preferably atmospheric pressure will be maintained in the fractionating column 14, separator 5, and connecting pipe lines. By this method of operation, natural gas or constituents of natural gas may be charged to this apparatus through the pipe 16, and this material will be converted into synthetic crude oil and gases. The apparatus is so arranged that after this conversion has taken place the converted material may be separated into the following fractions: Permanent gases which are vented from the system, gases which are more volatile than gasoline and which are recirculated through the process, gasoline which is recovered separately as a product of the process, and hydrocarbon liquids which are heavier than gasoline and which are recirculated through the process. Gas delivered to the apparatus would ordinarily contain certain permanent gases which if not vented from the system would in a short time fill the system up and discontinue the operation of the process, also hydrogen will be continuously evolved within the system, and if this gas is not vented from the system it will become filled with hydrogen and cease to operate. The material produced within the apparatus which is more volatile than gasoline and which is re-cycled through the apparatus is maintained under high pressure at all times and preferably in liquid form in order that recirculation may be accomplished economically. When gas only is supplied from an extraneous source to the apparatus, a considerable quantity of hydrogen will necessarily be vented from the system.

Instead of supplying gas only to this process, fuel oil or gas oil may be supplied from an extraneous source to supply carbon with which to combine the excess hydrogen contained in the gas in which case hydrogen will preferably not be vented from the system and only such permanent gases as are inadvertently introduced into the system with the gas and heavy oil will be separated from other material in the system and vented therefrom. Liquids which contain a higher percentage of carbon than is contained in gasoline will be introduced into the system either through pipe 65 or pipe 78. In the event that crude oil should be introduced into this system, it should be introduced through the pipe 78 and gasoline contained in this crude oil would be distilled and separated from the fuel oil and gas oil contained in the crude oil in the fractionating system and the gas oil and fuel oil contained in this crude oil would enter the pipe 16 as a recirculated liquid coming from either fractionating column 14 or separator 6. This is an indirect way of introducing fuel oil or gas oil into the system when crude oil only is available for the purpose.

It will be found desirable in some cases to cool any liquid which is heavier than gasoline and which is introduced into the pipe 16 and to initially use this heavy oil for an absorbent to absorb constituents of natural gas and subsequently introduce the mixture of heavier than gasoline liquids and lighter than gasoline liquids thus produced into the pipe 16. The absorber 15 with interconnecting lines shown may be used for this purpose.

As stated in my original application for Letters Patent covering this gas conversion process, I do not propose to limit the process to natural gas but may use the process to convert other hydrocarbon gases to liquids and it should be understood that the improvements which are divulged and claimed herein may be used in a manner similar to that described to process hydrocarbon gases other than natural gas. I will probably process hydrocarbon gases which are produced by the cracking of heavy oils such as gas oil and fuel oil. In some cases, I will in the manner described herein, add carbon which is contained in heavy oils such as fuel oil or gas oil, to hydrocarbon gases which result from cracking natural gas under comparatively low pressure and at high temperature instead of adding such heavy oils to the virgin natural gas.

In the embodiment of the invention illustrated in Fig. 2, a mixture of liquefied hydrocarbon gas and hydrocarbon liquid, the source of which will be designated later, will be caused to flow through a pipe 1a which leads through a furnace 2a into the bottom of a high pressure fractionating column 3a and in which is mounted a valve 4a. This mixture will be heated while passing through pipe 1a and the furnace 2a to a temperature between 750° F. and 950° F. and will be delivered into the bottom of the fractionating column 3a in a partially vaporized state. Vapors thus delivered into the bottom of the fractionating column 3a will flow thence upward through the bubble plates 5a in fractionating column 3a and thence through a pipe 6a which leads through a condenser 7a into a gas liquid separator 8a. Part of the vapors which pass through the pipe 6a and condenser 7a will be condensed therein and a mixture of gas and liquid will flow from the pipe 6a into the separator 8a. A sufficient quantity of the liquid which will accumulate in separator 8a will be delivered by a pump 9a through a pipe 10a in which is mounted a valve 11a into the top of fractionating column 3a to condense in fractionating column 3a all of the gasoline and heavier vapors delivered into fractionating column 3a. That part of the liquid which accumulates in separator 8a in excess of the liquid withdrawn therefrom through pipe 10a will flow therefrom through a pipe 12a into the bottom of an absorbing column 13a. Gas will flow from the top of separator 8a through a pipe 14a into the bottom of absorber 13a and thence upward through bubble plates 15a in absorber 13a and thence from the top of absorber 13a through a pipe 16a in which is mounted a back pressure valve 17a. Liquid will be released from the bottom of fractionating column 3a through a pipe 18a in which is mounted a valve 19a into a fractionating column 20a. By means of the valve 19a and the valve 17a pressure will be maintained in the fractionating column 3a in excess of the pressure which will be maintained in the fractionating column 20a and as a result, liquid which will flow into fractionating column 20a through the pipe 18a, will partially vaporize upon entry into fractionating column 20a and vapors thus produced will flow upward through bubble plates 21a in fractionating column 20a and thence through a pipe 22a which leads through a condenser 23a into an accumulator tank 24a. A sufficient quantity of liquid will be delivered from accumulator 24a by a pump 25a through pipe 26a in which is mounted a valve 27a into the top of fractionating column 20a to condense in fractionating column 20a all of the vapors introduced therein except gasoline vapors. Thus gasoline vapors only will flow through pipe 22a and condenser 23a and gasoline only will flow into accumulator 24a. A vent line 28a in which is mounted a valve 29a is provided for the release from accumulator tank 24a of any gas which may inadvertently accumulate therein. Gasoline will be withdrawn from the bottom of accumulator tank 24a through a pipe 30a in which is mounted a valve 31a. Some of the liquid which will flow downward in the fractionating column 20a over bubble plates 21a may be withdrawn through a pipe 32a from one of bubble plates 21a which is located above the point of entry of pipe 18a into fractionating column 20a and may be forced by a pump 33a through a pipe 34a in which is mounted a valve 35a and which leads through the furnace 2a and into the bottom of fractionating column 20a. Liquid which may be delivered through pipe 34a may be heated in the furnace 2a and thus the fractionating column 20a may be heated. Liquid may be withdrawn from fractionating column 20a through pipe 32a and may be delivered by pump 33a through a pipe 36a in which is mounted a valve 37a into and through the pipe 1a. Residue may be withdrawn from the bottom of fractionating column 20a through a pipe 55a in which is mounted a valve 56a by a pump 57a and may be forced by pump 57a through a pipe 58a into and through pipe 1a. Distillate may be drawn from one of the bubble plates 21a through a pipe 38a in which is mounted a valvee 39a. Fuel oil will be withdrawn from the bottom of fractionating column 20a through a pipe 40a in which is mounted a valve 41a. Hydrocarbon liquid such as crude oil or fuel oil or the like will be delivered through a pipe 42a in which is mounted a valve 43a into the top of absorber 13a and will flow thence downward over bubble plates 15a, contacting and absorbing a portion of the gas which will flow upward through absorber 13a. A mixture of oil and liquefied gas which will collect in the bottom of absorber 13a will be delivered by means of a pump 46a through a pipe 44a in which is mounted a valve 45a into and through the pipe 1a. In case a supply of cracked gas is available, such gas may be delivered through a pipe 47a in which is mounted a valve 48a into and through pipe 1a. Delivery of gas from an extraneous source to the process through the pipe 47a is optional as the process may be carried out either with or without thus supplying gas to the process. A portion of the liquid which flows downward over bubble plates 5a in fractionating column 3a may be withdrawn from an intermediate one of bubble trays 5a and discharged therefrom through the pipe 49a and valve 50a into fractionating column 20a at a point intermediate between bubble trays 21a as a means of increasing the degree of rectification obtained through the combined use of the fractionating columns 3a and 20a. A portion of the liquid which flows downward over bubble plates 5a may be withdrawn from the fractionating column 3a through a portion of the pipe 49a and through a pipe 51a and a valve 52a and through a cooler 53a and may be delivered by a pump 54a which is mounted in pipe 51a into the pipe 1a and through valve 4a to cool the liquid which is expanded through valve 4a and to wash the parts of the valve 4a and maintain these parts in a workable condition.

Conversion of hydrocarbons will take place in the pipe 1a and the maintenance of higher pressures in the pipe 1a will result in increased conversion of gas to liquid therein. Although some conversion of gas to liquid may be obtained in the pipe 1a under pressure below 500 pounds per square inch, I will preferably maintain pressure in the pipe 1a above 500 pounds per square inch. Insofar as conversion of gases to liquids is concerned it would be advantageous to maintain a pressure in the pipe 1a of 5000 pounds, or upwards; however, the maintenance of such a pressure in a commercial unit of this type would be impractical as no materials of construction are available from which such a unit could be economically constructed for commercial use.

I have confined mixtures of fuel oil and cracked gas and heated the confined mixture to temperatures as high as 900° F. noting the pressure set up by the heated mixtures and found that equilibrium pressure for these mixtures at 850° F. and higher are 3000 pounds per square inch and higher. The apparatus which I used was constructed for a maximum operating pressure of 4000 pounds per square inch at 900° F. and I found that a mixture of light gas and gas oil set up 4000 pounds per square inch pressure when heated to 900° F. These were the maximum conditions under which I made tests. I have tested many different mixtures of cracked gas and fuel oil and find that equilibrium pressures for various mixtures taken at the same temperature vary widely. Good results may be obtained when converting these mixtures under pressures below equilibrium pressure, and for practical reasons I intend to so operate. It is desirable to vary the pressure maintained in the pipe 1a. When converting mixtures of gas and fuel oil which have high equilibrium pressures I intend to convert under higher pressures and vice versa.

I have converted various mixtures of cracked gas and fuel oil in a tube similar to the pipe 1a under pressures ranging from 1000 pounds per square inch to 3000 pounds per square inch and at temperatures ranging from 910° F. and lower and I find that in order to obtain a maximum yield of gasoline from the various mixtures which I have tried it is necessary to alter both the temperature and pressure under which the conversion of the various mixtures is obtained. Also the composition of the gasoline produced varies with the pressure of conversion.

In order to secure flexibility of operation I intend to construct the pipe 1a to hold as much as 3000 pounds pressure per square inch at 900° F. and by manipulation of the valve 4a try various conversion conditions of both temperature and pressure to ascertain the best conversion conditions for any particular mixture. The results of the many tests which I have conducted indicate that for the production of gasoline the best conversion temperature will be close to 850° F. and the best conversion pressure will be between 1000 pounds per square inch and 3000 pounds per square inch.

By means of operating the valves 19a, 50a, 59a and 17a, I will normally maintain a pressure in the fractionating column 3a and separator 8a and the absorber 13a and in interconnecting lines sufficiently high so that gases leaving the top of fractionating column 3a through pipe 6a will be stripped of gasoline vapors. This pressure should be maintained at from 250 pounds to 400 pounds per square inch. There is no reason why this pressure should not be maintained above 400 pounds per square inch except that the cost of equipment would be correspondingly higher. If this pressure is maintained below 250 pounds per square inch and the temperature of cooling water used in condenser 7a is 90° F. to 100° F. some gasoline will escape through this condenser with the gas which leaves the top of fractionating column 3a. By means of a valve 59a which is disposed in pipe 14a the pressure in absorber 13a may be held lower than the pressure held in separator 8a.

By means of operating valves 29a, 31a, 41a and 39a, a pressure only sufficient to cause condensation of gasoline vapors in the column 3a will be maintained in the fractionating column 20a and the accumulator 24a and interconnecting lines.

This process may be started in operation by charging fuel oil only through the pipe 1a and as soon as any gas is produced as a result of so charging fuel oil to the process a portion of this gas will be liquefied by the incoming charge of oil and will be added thereto. It should be noted particularly that by this process comparatively heavy oils may be converted to gasoline and that gas which results from such conversion may be returned through the process and thereby reconverted and liquefied. Gas obtained from a source extraneous to the process may or may not be processed as dictated by any particular set of circumstances.

While I have illustrated and described certain methods in such manner that the same may be readily understood by those skilled in the art, I am aware that changes may be made in the details disclosed without departing from the spirit of the invention, as expressed in the appended claims.

What is claimed and desired to be secured by Letters Patent is:

1. A process for producing motor fuel with a high anti-knock rating from a mixture of normally gaseous and normally liquid hydrocarbons, said process comprising passing said mixture through a conversion zone at a pressure above 2000 pounds per square inch and at a temperature adapted to effect conversion at said pressure, then passing the converted products directly to a first separating zone at a pressure substantially lower than that of the conversion zone and appreciably above atmospheric and at a temperature insufficient to effect conversion but sufficient to separate said products into a lighter than gasoline fraction and a second fraction consisting of gasoline and heavier hydrocarbons, said lighter than gasoline fraction comprising a substantial portion of fixed gas and a substantial portion of normally gaseous hydrocarbons, condensing said normally gaseous hydrocarbons and venting off said fixed gas, returning a portion of the condensed normally gaseous hydrocarbons in liquid condition to said first separating zone and another portion to the inlet of said conversion zone, and passing the said second fraction into a second separating zone at a pressure appreciably lower than that of the first separating zone and not appreciably above atmospheric and at a temperature adapted to effect removal of all gasoline fractions from said second fraction in said second separating zone.

2. A process for manufacturing motor fuel with a high anti-knock rating from a mixture of normally gaseous and normally liquid hydrocarbons, comprising passing said mixture in a restricted stream through a heating zone while heating the same to a conversion temperature and maintaining the mixture at a pressure above 2000 pounds per square inch; then passing the resultant converted products directly to a first separating zone at a pressure intermediate the heating zone pressure and atmospheric pressure and at a temperature inadequate to effect conversion but sufficient to separate said products into a lighter than gasoline fraction and a second fraction consisting of gasoline and heavier hydrocarbons, said lighter than gasoline fraction comprising a substantial portion of fixed gas and a substantial portion of normally gaseous hydrocarbons, condensing said normally gaseous hydrocarbons and venting off said fixed gas, returning a portion of the condensed normally gaseous hydrocarbons to said first separating zone and another portion to the inlet of said conversion zone, passing the said second fraction into a second separating zone at a pressure appreciably lower than that of the first separating zone and not appreciably above atmospheric and at a temperature adapted to effect removal of all gasoline fractions from said second fraction in said second separating zone and circulating a portion of the heavier than gasoline material from said second separating zone through a heater and back to said second separating zone for furnishing the necessary heat in the second fractionating zone to vaporize the said gasoline therefrom.

MALCOLM P. YOUKER.